(12) United States Patent
Suzuki

(10) Patent No.: US 6,344,732 B2
(45) Date of Patent: Feb. 5, 2002

(54) ELECTRIC ENERGY CHARGING CONTROL APPARATUS AND METHOD FOR HYBRID VEHICLE

(75) Inventor: Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/803,914

(22) Filed: Mar. 13, 2001

(30) Foreign Application Priority Data

Mar. 23, 2000 (JP) .......................................... 12-082748

(51) Int. Cl.$^7$ ................................................ H02J 7/00
(52) U.S. Cl. ........................ 320/132; 180/65.1; 702/63
(58) Field of Search ................................. 320/135, 132, 320/134, 136; 180/65.1; 702/63

(56) References Cited

U.S. PATENT DOCUMENTS 6,163,133 A * 12/2000 Laig-Horstebrock et al. .... 320/132
6,163,135 A * 12/2000 Nakayama et al. .......... 320/150
6,209,672 B1 * 4/2001 Severinsky ................ 180/65.2
6,235,127 B1 * 6/2001 Itoyama et al. ............... 701/22

FOREIGN PATENT DOCUMENTS

JP       A 8-98321       4/1996
JP       A 11-299004       10/1999

* cited by examiner

Primary Examiner—Gregory Toatley
(74) Attorney, Agent, or Firm—Oliff & Berridge, PLC

(57) ABSTRACT

A controller predicts a requested state of charge/discharge corresponding to a future run of a hybrid vehicle. If it is predicted that the hybrid vehicle will be stopped and restarted, or will be greatly accelerated and therefore that a request for a great discharge will be outputted in the future, the controller increases a target SOC of an HV battery to increase the value to which the charge of the HV battery will be converged in preparation for the great discharge. If it is predicted that a great regenerative electric power will be generated by a vehicle deceleration and therefore that a request for charging will be outputted, the target SOC is reduced, and the amount of charge in the HV battery is reduced, so that the regenerative power generated can be efficiency recovered.

18 Claims, 5 Drawing Sheets

ELECTRIC ENERGY CHARGING CONTROL APPARATUS AND METHOD FOR HYBRID VEHICLE

INCORPORATION BY REFERENCE

The disclosure of Japanese Patent Application No. 2000-082748 filed on Mar. 23, 2000 including the specification, drawings and abstract is incorporated herein by reference in its entirety.

BACKGROUND OF THE INVENTION

1. Field of the Invention

The invention relates to electric energy charging control apparatus and method for a hybrid vehicle. More specifically, the invention relates to electric energy charging control apparatus and method for hybrid vehicle, that achieve efficient utilization of an electric energy storage device while allowing a size reduction of the electric energy storage device in a hybrid vehicle that needs a large amount of electric energy output in order to assist the running of the vehicle through the use of a motor-generator.

2. Description of the Related Art

Vehicles equipped with hybrid vehicle (HV) systems that achieve great advantages in environmental protection and fuel economy improvement (hereinafter, referred to as "hybrid vehicles (HV)") are being developed and commercialized. An HV system is a power train that uses a combination of two kinds of drive power sources, for example, an internal combustion engine (a gasoline engine, a diesel engine, etc.) and an electric motor. By selectively using the engine and the electric motor in accordance with the driving condition, the system makes full use of the advantages of the two drive power sources, and supplements disadvantageous aspects of the two drive power sources with each other, so as to achieve smooth and highly responsive power performance. That is, by operating one of the engine and the electric motor alone or both of them in concert, the system is able to improve fuel economy and considerably reduce exhaust emissions. For example, during a low-load region where the engine efficiency is low (in particular, at the time of a vehicle start or a very low vehicle speed), the engine is not started, but the electric motor alone is operated to drive the vehicle. When the vehicle enters a speed region where the engine efficiency is high, the engine is started and the electric motor is stopped. When an increased output is needed, for example, during acceleration or the like, the engine and the electric motor are simultaneously operated to perform torque assist using the electric motor so that a desired output can be obtained.

When the electric motor is used in this manner, electric power is supplied from a battery installed in the vehicle. Therefore, the hybrid vehicle needs to be equipped with a large-capacity battery. In order to realize good use of the electric motor as described above, the state of charge (SOC) of the battery must always be controlled.

A typical hybrid vehicle is equipped with a motor-generator (MG) that performs an electric motor function and a power generating function. The MG is controlled so as to generate electric power so that the amount of charge in the battery converges to a target value of charge of the battery (target SOC). For example, Japanese Patent Application Laid-Open No. HEI 11-299004 discloses a control method for maintaining a targeted SOC by adjusting the engine output in accordance with the SOC.

Normally, the target SOC of a hybrid vehicle is set to a fixed value (e.g., an amount of charge being 60% of the full amount) with such a good margin between an upper limit and a lower limit that a discharge request (an electric motor drive request) and a charge request (a request for power charging through regeneration) can be accepted.

However, with regard to the hybrid vehicles, there are demands for reductions in vehicle weight, increases in compartment space, reductions in vehicle cost, etc. Therefore, battery size reductions are needed. If a battery is reduced in size, the battery capacity naturally reduces. In that case, therefore, a problem arises when the battery is to be charged or discharged. That is, the amount of charge or discharge allowed with reference to the target SOC reduces. As a result, it becomes impossible to discharge an amount that is needed at the time of a vehicle start or acceleration. A problem also arises at the time of deceleration. That is, only a small amount of energy can be charged into the battery although a large amount of regenerative electric power is generated. Thus, the amount of electric energy generated cannot be sufficiently utilized, and efficient utilization of energy (battery) cannot be realized.

Furthermore, the chemical reactions that occur inside batteries become slow when the battery ambient temperature decreases. Therefore, at low temperatures, the charging/discharging efficiency decreases, and sufficient charging/discharging becomes impossible even when the state of charge has converged to a target SOC. Therefore, according to the conventional art, it is inevitable to provide large-capacity (large-size) batteries in preparation for low ambient temperatures. Thus, the conventional art cannot meet the demand for a battery size reduction.

SUMMARY OF THE INVENTION

Accordingly, it is an object of the invention to provide an electric energy charging control apparatus of a hybrid vehicle that is capable of performing the requested charging/discharging at a high efficiency while allowing a size reduction of an electric energy storage device.

In accordance with a first aspect of the invention, an electric energy charging control apparatus of a hybrid vehicle includes an internal combustion engine, a motor-generator capable of assisting a run of the vehicle, an electric energy storage device connected to the motor-generator, controller that predicts a future state of charge/discharge of the electric energy storage device and changes a target value of charge of the electric energy storage device based on a result of prediction regarding charge/discharge of the electric energy storage device.

According to this construction, if it is predicted that the electric energy storage device will be discharged in the future, the target amount of charge of the electric energy storage device is changed to an increased value to increase the amount of charge beforehand, so that when the discharging occurs, an increased amount of discharge from the electric energy storage device can be provided. Conversely, if it is predicted that the electric energy storage device will be charged in the future, the target amount of charge of the electric energy storage device can be changed to a reduced value to reduce the amount of charge beforehand, so that when the charging occurs, an increased amount of charge into the electric energy storage device can be achieved. Therefore, a substantial electric energy charging/discharging range can be expanded. As a result, it becomes possible to efficiently perform charging/discharging as requested while allowing a size reduction of the electric energy storage device.

In the above-described aspect, the controller may predict the future state of the charge/discharge of the electric energy storage device based on a state of the run of the vehicle, and may increase the target value of charge when the state of the run of the vehicle is a state where it is predicted that at least a predetermined amount is discharged from the electric energy storage device, and the target value changing means may reduce the target value of charge when the state of the run of the vehicle is a state where it is predicted that at least a predetermined amount will be charged into the electric energy storage device.

The controller performs prediction regarding the charge/discharge of the electric energy storage device based on, for example, vehicle speed information. For example, if a low vehicle speed continues for a predetermined time, it is predicted that the vehicle will be stopped or greatly accelerated in the future. In association with a stop or a great acceleration, a large amount of electric energy will be consumed by the electric motor function of the motor-generator. Therefore, the target amount of charge of the electric energy storage device is increased to secure a sufficient amount of charge beforehand. Conversely, if a high vehicle speed continues for a predetermined time, it is predicted that the vehicle will be decelerated in the future. At the time of a deceleration, a great amount of regenerative energy will be obtained by the power generating function of the motor-generator. Therefore, the target amount of charge is reduced to increase the region for recovery of regenerative energy beforehand, so that regenerative energy will be sufficiently recovered. This construction makes it possible to efficiently perform charging/discharging as requested while allowing a size reduction of the electric energy storage device.

In the above-described aspect, the controller may change the target value of charge of the electric energy storage device in accordance with a vehicle ambient temperature.

According to this construction, if the vehicle ambient temperature is low, for example, below the freezing point, the target value of charge is increased so as to compensate for a reduction in the charging/discharging efficiency of the electric energy storage device caused by low temperature. Therefore, it is possible to efficiently perform charging/discharging as requested while allowing a size reduction of the electric energy storage device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENT

A preferred embodiment of the invention (hereinafter, referred to as "embodiment") will be described hereinafter with reference to the accompanying drawings.

Figure 1:
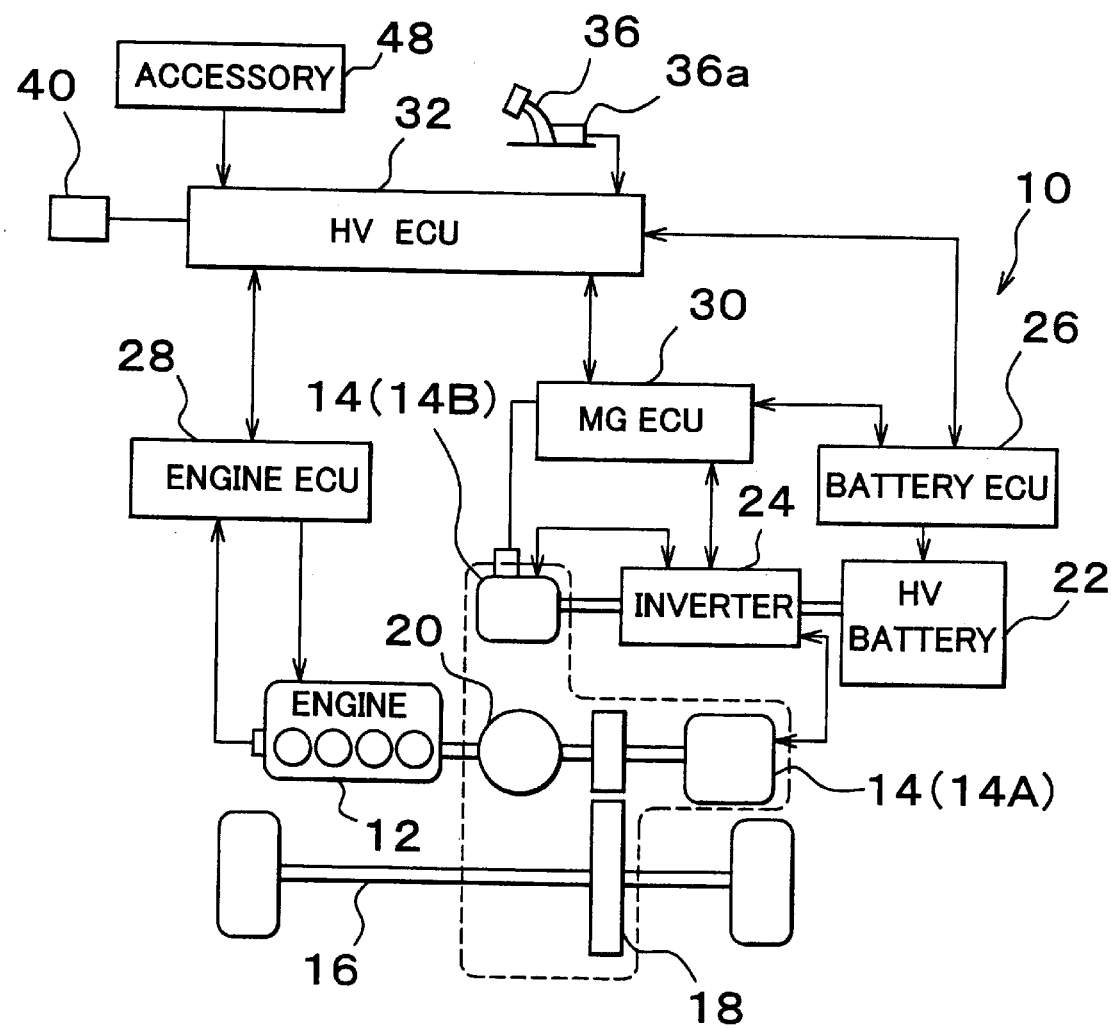
FIG. 1 is a conceptual diagram of a construction of a vehicle having a battery charging control apparatus in accordance with an embodiment of the invention.

FIG. 1 shows a conceptual diagram of a construction of a hybrid vehicle (HV) 10 in accordance with the embodiment of the invention. The hybrid vehicle 10 includes, as drive power sources, an internal combustion engine (hereinafter, simply referred to as "engine"), for example, a gasoline engine, a diesel engine, etc., and a motor-generator (MG) 14. In FIG. 1, the MG 14 is illustrated as an electric motor 14A and a generator 14B for the sake of convenience in illustration. However, in accordance with the running state of the hybrid vehicle 10, the electric motor 14A can function as a generator, and the generator 14B can function as an electric motor.

The hybrid vehicle 10 further includes: a speed reducer 18 for transmitting power generated by the engine 12 or the MG 14 toward a wheel side 16 and transmitting the drive power from the wheel side 16 to the engine 12 or the MG 14; a power splitter mechanism (e.g., a planetary gear in FIG. 1) 20 for distributing the power generated by the engine 12 to two paths, that is, to the wheel side 16 and the generator 14B; an HV battery 22 as an electric energy storage device for storing electric power for driving the MG 14; an inverter 24 for performing current control while performing conversion between the direct current related to the HV battery 22 and the alternating current related to the electric motor 14A and the generator 14B; a battery electronic control unit (hereinafter, referred to as "battery ECU") 26 for managing and controlling the state of charge/discharge of the HV battery 22; an engine ECU 28 for controlling the operation state of the engine 12; an MGECU 30 for controlling the MG 14, the battery ECU 26, the inverter 24, etc., in accordance with the state of the hybrid vehicle 10; an HVECU 32 for controlling the entire HV system so that the hybrid vehicle 10 can run at a maximum efficiency by managing and controlling the battery ECU 26, the engine ECU 28, the MGECU 30, etc. in an interrelated manner; etc. Although in FIG. 1, the ECUs are separate units, two or more of the ECUs may be integrated into a single ECU.

In the hybrid vehicle 10 equipped with the HV system as shown in FIG. 1, the electric motor 14A of the MG 14 alone is used to drive the hybrid vehicle 10 when the efficiency of the engine 12 is low, for example, at the time of a vehicle start, a low-speed travel, etc. During a normal travel, for example, the power from the engine 12 is divided into the two paths by the power splitter mechanism 20, so as to directly drive the wheel side 16 on one hand and drive the generator 14B for electric power generation on the other hand. The electric power thus generated is used to drive the electric motor 14A so as to assist the driving of the wheel side 16. During a high-speed travel, electric power from the HV battery 22 is supplied to the electric motor 14A to increase the output of the electric motor 14A, thereby adding to the drive power for the wheel side 16. During a deceleration, the electric motor 14A, driven by the wheel side 16, functions as a generator to perform regenerative power generation. The thus-recovered power is stored into the HV battery 22. When the amount of charge in the HV battery 22 decreases so that the charging of the HV battery 22 is needed, the output of the engine 12 is increased to increase the power generated by the generator 14B in order to increase the amount of charge in the HV battery 22. Even during a low-speed travel, a control of increasing the amount of driving output of the engine 12 is performed if necessary, for example, when the charging of the HV battery 22 is needed, or when an accessory appliance, such as an air-conditioner or the like, is driven, or when the temperature of cooling water of the engine 12 is to be raised to a predetermined temperature.

A feature of this embodiment is that even if the HV battery 22 is reduced in size and therefore is reduced in capacity, the efficient charging/discharging of the HV battery 22 is performed by predicting a future charge/discharge state of the HV battery 22 and appropriately changing a target state of charge (target SOC) of the HV battery 22.

Figure 2:
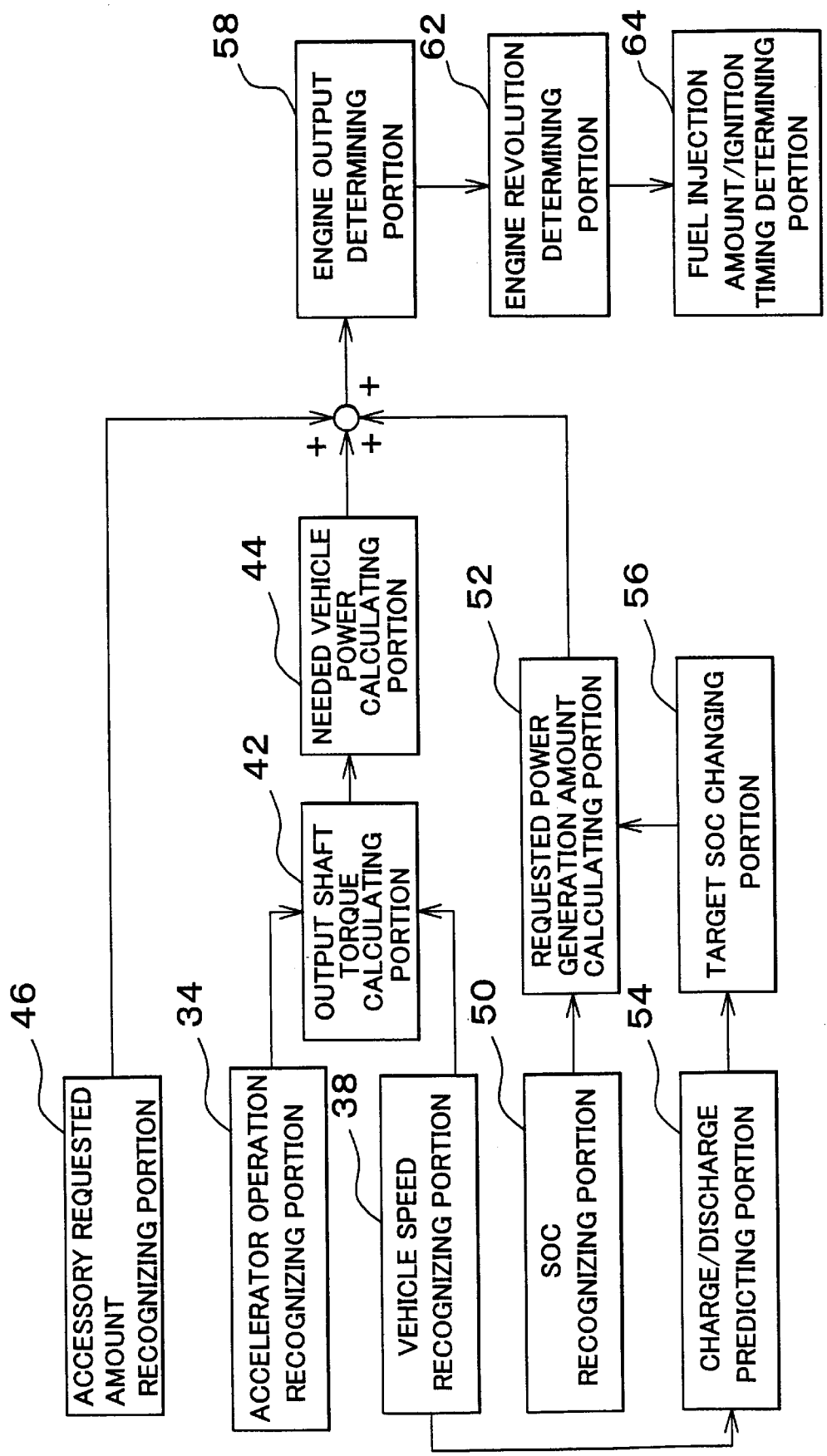
FIG. 2 is a functional block diagram illustrating a target SOC changing procedure performed by a control unit of the vehicle having the battery charging control apparatus in accordance with the embodiment of the invention.

FIG. 2 is a block diagram illustrating internal constructions of the ECUs shown in FIG. 1 separately for functions, to help describe the changing of the target SOC of the HV battery 22 in relation with the ECUs.

Normally, the HVECU 32, while controlling the driving of the hybrid vehicle 10, generally manages the output of the engine 12 and the driven state of the MG 14 so that the SOC of the HV battery 22 converges to the target SOC. The target SOC is set to a default value of 60% or so in order to allow both the charging and the discharging to be performed to some extents.

The overall control of the hybrid vehicle 10 will next be described. Firstly, an accelerator operation recognizing portion 34 included in the HVECU 32 recognizes an amount of depression of an accelerator caused by a driving person through the use of a sensor 36a disposed on an accelerator pedal 36. A vehicle speed recognizing portion 38 recognizes a present vehicle speed of the hybrid vehicle 10 based on information from a vehicle speed sensor 40 and the like. An output shaft torque calculating portion 42 calculates an output shaft torque needed to achieve a traveling state requested by the driving person, based on the amount of accelerator operation and the vehicle speed. A needed vehicle power calculating portion 44 calculates an engine power needed to achieve the traveling state requested by the driving person. An accessory requested amount recognizing portion 46 calculates an energy needed to operate an accessory 48, such as an air-conditioner or the like, based on the operation state of the accessory 48.

Figure 3:
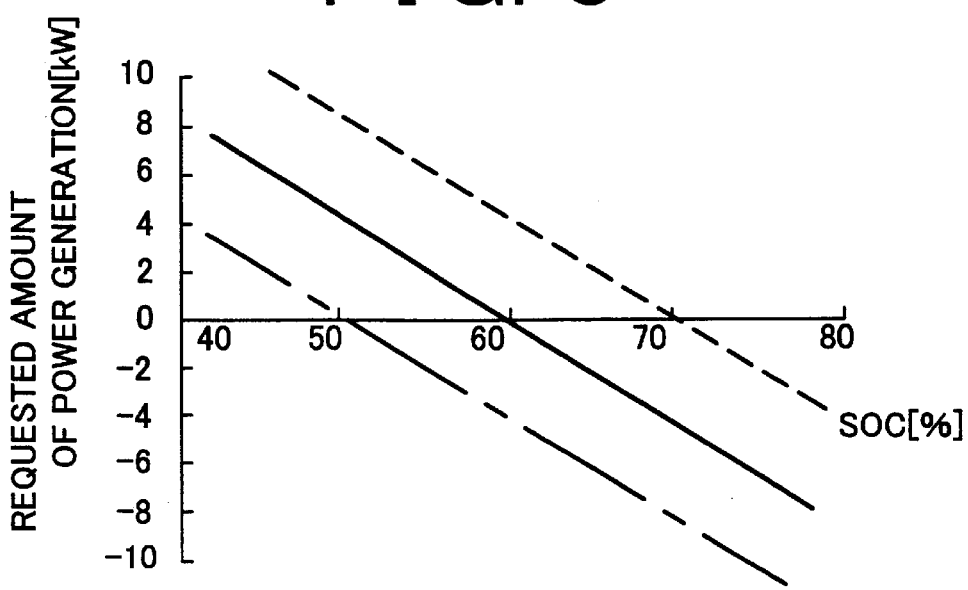
FIG. 3 is a diagram illustrating a concept of calculation of a requested amount of power generation with respect to the SOC of a battery performed by the battery charging control apparatus in accordance with the embodiment of the invention.

An SOC recognizing portion 50 included in the battery ECU 26 checks the state of charge of the HV battery 22. A target SOC is set in the battery ECU 26 in order to maintain an optimal SOC of the HV battery 22. Normally, a requested power generation amount calculating portion 52 calculates a requested amount of power generation that can be generated by the generator 14B such that the SOC converges to the target SOC (e.g., 60%). For example, if the present SOC of the HV battery 22 recognized by the SOC recognizing portion 50 is 50% when the target SOC has been set to 60%, the power generation of 4 kW is requested as indicated in FIG. 3. If the present SOC of the HV battery 22 is 70%, the power generation of −4 kW, that is, the discharge of 4 kW, is requested.

As mentioned above, there are cases where depending on a further travel of the hybrid vehicle 10, the discharging of a great amount of power is requested, or the charging of a great amount is requested in response to generation of a great amount of regenerative power. However, if the HV battery 22 is reduced in size, the amount of charge or discharge allowed with reference to the target SOC reduces, so that sufficient charging/discharging may become impossible. Therefore, a charge/discharge predicting portion (charge/discharge predicting means) 54 included in the HVECU 32 predicts what manner of running the hybrid vehicle 10 will undergo in the future, based on, for example, information from the vehicle speed recognizing portion 38. Based on a result of the prediction, a target SOC changing portion (target value changing means) 56 included in the HVECU 32 changes the target SOC from the default value of 60%. For example, if a low vehicle speed continues for at least a predetermined time, it is predicted that the hybrid vehicle 10 will be stopped, or will be greatly accelerated in the future. If the hybrid vehicle 10 is stopped, the next action performed is a start. As mentioned above, at the time of starting, the engine revolution speed needs to be quickly raised. Therefore, it is predicted that discharge from the HV battery 22 will be performed. In particular, if the engine 12 is a diesel engine having a relatively great friction, it is predicted that a further increased amount of discharge will be caused. Furthermore, when the hybrid vehicle 10 is greatly accelerated, it is desirable that the torque assist by the electric motor 14A be performed. Therefore, great discharge from the HV battery 22 is predicted. Thus, when the hybrid vehicle 10 is running at a low vehicle speed, the next traveling operation predicted involves the consumption of a great amount of electric energy by the electric motor 14A. Therefore, it is necessary to have an increased amount of electric power ready. Hence, the target SOC is increased to secure a sufficient amount of charge.

Conversely, if a high vehicle speed continues for at least a predetermined time, it is predicted that the hybrid vehicle 10 will be decelerated in the future. Since a great amount of regenerative energy will be obtained through the generator 14B during acceleration, the target SOC is reduced to increase the free capacity of the HV battery 22 so that the regenerative energy will be recovered without wastage. In order to increase the free capacity of the HV battery 22, it is necessary to discharge the HV battery 22 by using the electric motor 14A. By driving the electric motor 14A based on the discharge, the drive power for the hybrid vehicle 10 can be increased, so that the output of the engine 12 can be correspondingly reduced and the fuel economy can be improved.

An example of the procedure of changing the target SOC will be described with reference to the flowchart of FIG. 4. First, the target SOC changing portion 56 sets the target SOC to the default value of 60% (S100). Subsequently, the charge/discharge predicting portion 54 acquires vehicle speed information from the vehicle speed recognizing portion 38, and determines whether a high vehicle speed has continued for a predetermined time (S101). For example, if the hybrid vehicle 10 has been traveling at a high vehicle speed of at least 80 km/h (an average vehicle speed of 80 km/h) for at least 5 minutes, the charge/discharge predicting portion 54 predicts that the hybrid vehicle 10 will be decelerated at some future time. As described above, when the hybrid vehicle 10 is decelerated, the generator 14B is driven by a drive power obtained from the wheel side 16, thereby performing regenerative power generation. In this case, the regenerated electric power increases with increases in deceleration. Therefore, in order to recover as much regenerative power as possible, a region for charging regenerative power is made ready in the HV battery 22 beforehand. That is, in order to reduce the present SOC of the HV battery 22, the target SOC is changed from the default value of 60% to, for example, 50% (S102).

Conversely, if the charge/discharge predicting portion 54 determines in S101 that the high vehicle speed has not continued for the predetermined time, the charge/discharge predicting portion 54 then determines whether a low vehicle speed has continued for a predetermined time (S103). For example, if the hybrid vehicle 10 has been traveling at a low vehicle speed of at most 20 km/h (an average vehicle speed of 20 km/h) for at least 5 minutes, the charge/discharge predicting portion 54 predicts that the hybrid vehicle 10 will be stopped or greatly accelerated at some future time. As described above, after the hybrid vehicle 10 is stopped, restarting will be performed, so that the driving of the electric motor 14A will be needed and a large amount of discharge from the HV battery 22 will be caused. In the case of great acceleration, too, the driving of the electric motor 14A is needed, so that a large amount of discharge from the HV battery 22 will be caused. In order to previously secure the power discharged in such a case, the target SOC of the HV battery 22 is changed from the default value of 60% to, for example, 70% (S104) to increase the present SOC. If it is determined in S103 that the low vehicle speed has not continued for the predetermined time, the target SOC of 60% is maintained.

After the target SOC changing portion 56 supplies the thus-determined target SOC to the requested power generation amount calculating portion 52, the requested power generation amount calculating portion 52 determines a requested amount of power generation by comparing the target SOC with the present SOC of the HV battery 22 recognized by the SOC recognizing portion 50. That is, if the present SOC is 50% whereas the target SOC has been changed to 70%, power generation of 8 kW is requested as indicated by a broken line in FIG. 3. If the present SOC is 60% whereas the target SOC has been changed to 50%, power generation of −4 kW, that is, discharge of 4 kW, is requested as indicated by a one-dot chain line in FIG. 3. In short, it is determined how much the output of the engine 12 should be increased or reduced in order for the generator 14B to perform the power generation needed.

After that, an engine output determining portion 58 included in the HVECU 32 determines an engine output, that is, a total of an engine power needed to achieve a driving person-requested traveling state that is calculated by the needed vehicle power calculating portion 44, an engine power needed to obtain an amount of energy needed to operate the accessory 48 which is calculated by the accessory requested amount recognizing portion 46, and an engine power needed to obtain an amount of generated power needed to converge the SOC of the HV battery 22 to the target SOC determined through calculation by the requested power generation amount calculating portion 52.

After an engine output is determined, the HVECU 32 operates as described below so that the hybrid vehicle 10 will run at a highest efficiency. That is, an engine revolution determining portion 62 included in the engine ECU 28 determines an engine revolution speed, and a fuel injection amount/ignition timing determining portion 64 determines an amount of fuel injected and an ignition timing, thereby controlling the running of the hybrid vehicle 10.

Figure 5:
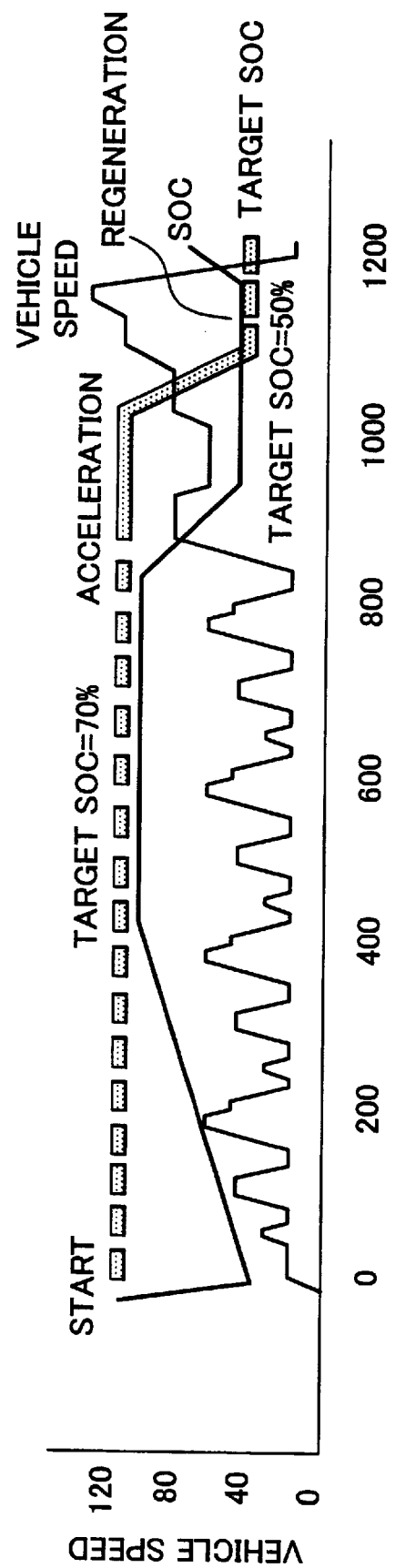
FIG. 5 is a diagram indicating changes in the SOC of an HV battery, changes in the vehicle speed of an hybrid vehicle, and changes in the target SOC that occur at the time of the control by the battery charging control apparatus in accordance with the embodiment of the invention.

FIG. 5 indicates changes in the SOC of the HV battery 22 (thick solid line), changes in the vehicle speed of the hybrid vehicle 10 (thin solid line), and changes in the target SOC (broken line). The target SOC has been increased to 70% as a result of a stop of the hybrid vehicle 10. Simultaneously with a starting operation, the SOC of the HV battery 22 considerably decreases. However, a sufficient and smooth start of the hybrid vehicle 10 is realized since the amount of charge of the HV battery 22 has been increased beforehand by increasing the target SOC. Referring to FIG. 5, it is recognized that the average vehicle speed is 20 km/h, and the target SOC is maintained at 70% for a while, so that the SOC of the HV battery 22 is converged to 70% in preparation for a predicted future restart or great acceleration. After that, acceleration is performed, and it is recognized that the average vehicle speed is 80 km/h. Then, the target SOC is changed to 50%, so that the SOC of the HV battery 22 is converged to 50% in preparation for the recovery of regenerative power caused by a predicted future deceleration.

Thus, even if the HV battery 22 is reduced in capacity (reduced in size), it is possible to perform smooth start or acceleration by predicting a future charge/discharge situation of the HV battery 22 of the hybrid vehicle 10 and securing a sufficient amount of charge prior to a request for a large amount of discharge. Furthermore, before a great regenerative power is obtained and a great charging request is outputted, a sufficient region for charging is secured such that the regenerative power can be recovered without wastage, and the electric motor 14A is actively used in order to secure a region for charging. As a result, the output of the engine 12 can be reduced, so that the fuel economy can be improved and the HV battery 22 can be used at a high efficiency as a whole.

Figure 6:
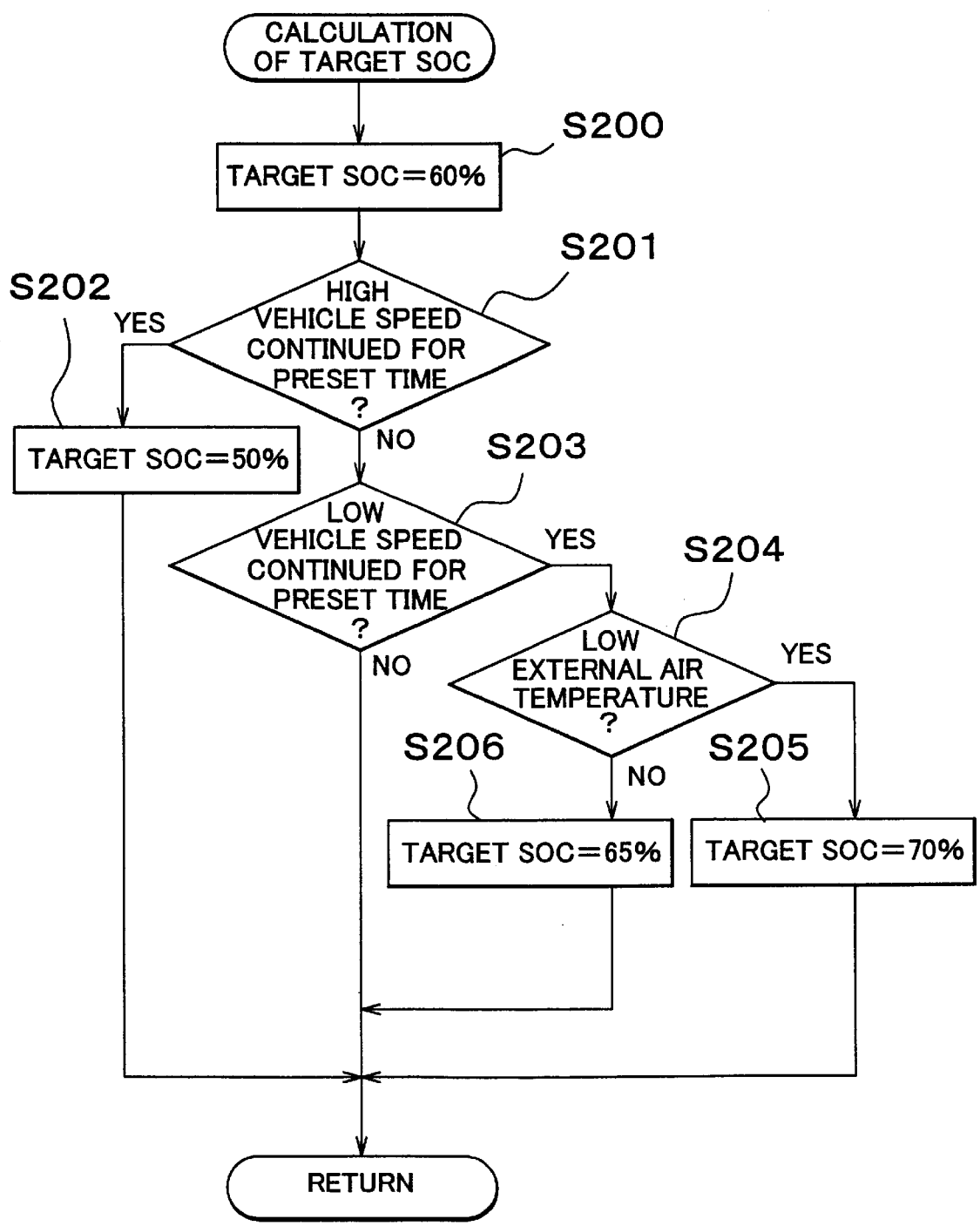
FIG. 6 is a flowchart illustrating a target SOC changing procedure performed by the battery charging control apparatus in accordance with the embodiment of the invention, taking into consideration the external air temperature.

FIG. 6 shows a flowchart illustrating a procedure of changing the target SOC taking into consideration that the charging/discharging efficiency of the HV battery 22 decreases depending on the vehicle ambient temperature.

Figure 4:
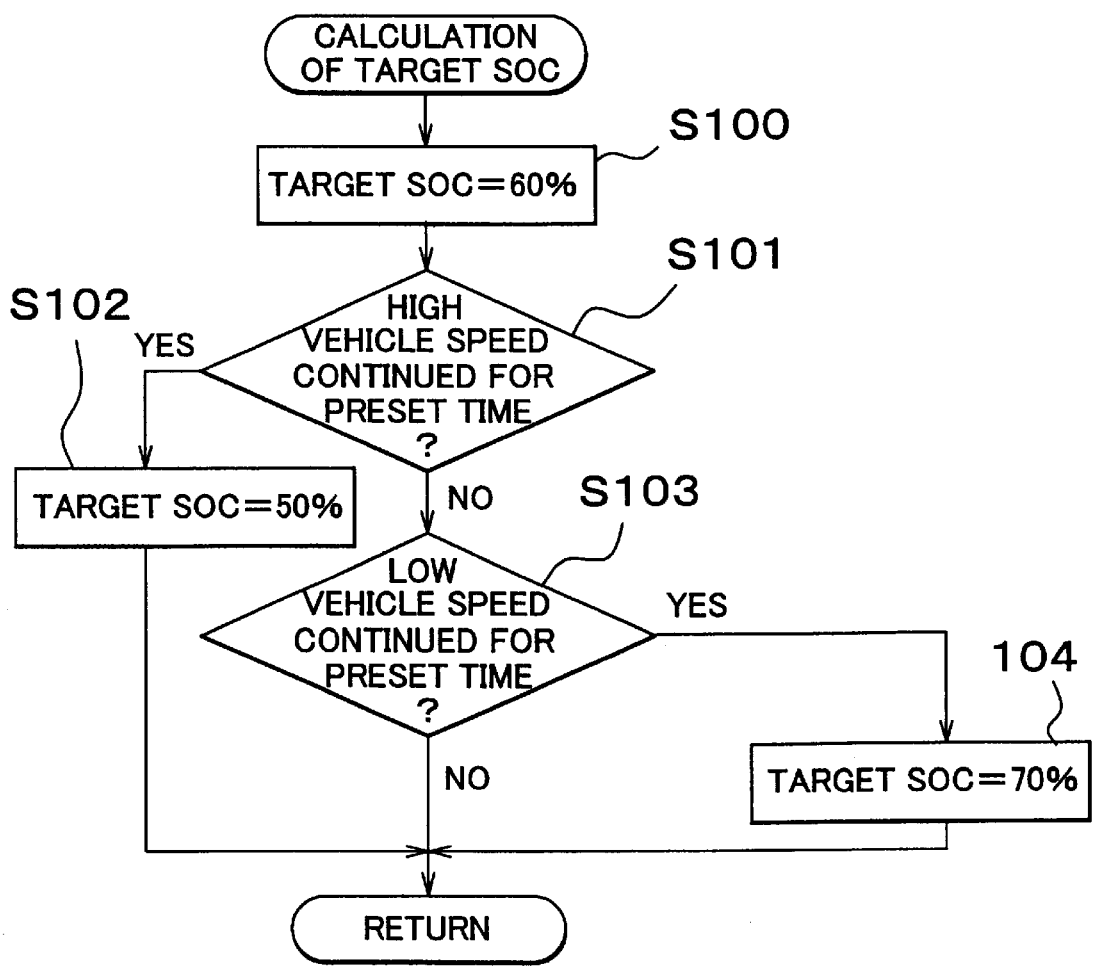
FIG. 4 is a flowchart illustrating the target SOC changing procedure performed by the battery charging control apparatus in accordance with the embodiment of the invention.

First, as in the flowchart of FIG. 4, the target SOC changing portion 56 sets the target SOC to the default value of 60% (S200). Subsequently, the charge/discharge predicting portion 54 acquires vehicle speed information from the vehicle speed recognizing portion 38, and determines whether a high vehicle speed has continued for a predetermined time (S201). For example, if the hybrid vehicle 10 has been traveling at a high vehicle speed of at least 80 km/h (an average vehicle speed of 80 km/h) for at least 5 minutes, the charge/discharge predicting portion 54 predicts that the hybrid vehicle 10 will be decelerated and regenerative power generation will be performed at some future time, and therefore predicts that an allowance for charging will be needed. As described above, when the hybrid vehicle 10 is decelerated, the generator 14B is driven by drive power obtained from the wheel side 16, thereby performing regenerative power generation. In this case, the power regenerated increases with increases in deceleration. Therefore, in order to recover as much regenerative power as possible, a region for charging regenerative power is prepared in the HV battery 22 beforehand. That is, in order to reduce the present SOC of the HV battery 22, the target SOC changing portion 56 changes the target SOC from the default value of 60% to, for example, 50% (S202).

Conversely, if the charge/discharge predicting portion 54 determines in S201 that the high vehicle speed has not continued for the predetermined time, the charge/discharge predicting portion 54 determines whether a low vehicle speed has continued for a predetermined time (S203). For example, if the engine 12 has been traveling at a low vehicle speed of at most 20 km/h (an average vehicle speed of 20 km/h) for at least 5 minutes, the charge/discharge predicting portion 54 predicts that a great amount of discharge will be requested in the future. In this case, the charge/discharge predicting portion 54 also determines whether the ambient temperature of the hybrid vehicle 10 is lower than a predetermined temperature, for example, 0° C., based on information from an external temperature sensor or the like (S204). If the external air temperature is lower than the predetermined temperature, the chemical reactions within the HV battery 22 become slow and the charging/discharging efficiency becomes low, so that the charge/discharge predicting portion 54 outputs to the target SOC changing portion 56 a command to increase the target SOC to, for example, 70%, in order to increase the amount of charge in the HV battery 22 beforehand (S205), in preparation for a large discharge request under a situation of a low charging/discharging efficiency (in particular, a start of the electric motor 14A below a freezing point or the like). As a result, when the hybrid vehicle 10 is started by the electric motor 14A, sufficient discharging from the HV battery 22 can be achieved and the hybrid vehicle 10 can be smoothly started, even if the charging/discharging efficiency of the HV battery 22 has fallen due to low temperature.

If the charge/discharge predicting portion 54 determines in S204 that the external air temperature is not below the predetermined temperature, that is, if it can be determined that the external air temperature does not adversely affect the chemical reactions in the HV battery 22, the charge/discharge predicting portion 54 outputs to the target SOC changing portion 56 a command to change the target SOC to a slightly increased value, for example, 65%, in preparation for a large amount of discharge at the time of a normal start or acceleration (S206). If it is determined in S203 that the low vehicle speed has not continued for the predetermined time, it is considered that a request for extreme charging/discharging of the HV battery 22 will not be made, and the target SOC is maintained at 60%.

Thus, by predicting how much of charging/discharging is needed for the next running of the hybrid vehicle 10 taking into consideration the charging/discharging efficiency of the HV battery 22 in addition to the present running state of the hybrid vehicle 10, it becomes possible to secure a sufficient amount of charge/discharge even if the HV battery 22 is reduced in size so that the charging/discharging range with reference to the target SOC is narrow. Thus, the HV battery 22 can be efficiently used.

In the embodiment, the default value of the target SOC is set to 60%, and the increased values thereof are set to 65% and 70%, and the reduced value thereof is set to 50%. However, these set values are arbitrary. It is preferable to select suitable set values taking into consideration the capability of the HV battery 22, the performance of the hybrid vehicle 10, the environment of use, etc. Furthermore, the conditions for changing the target SOC, such as the predetermined speed (average speed), the duration of continuation of the speed, the external air temperature, etc., are also arbitrary. That is, it is preferable to select suitable conditions.

In the above embodiment, the HV battery 22 is used as an electric energy storage device. However, the electric energy storage device of the invention is not limited only to a battery. A condenser may also be used as an electric energy storage device of the invention.

In the illustrated embodiment, the controller (the HVECU 32) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An electric energy charging control apparatus of a hybrid vehicle having an internal combustion engine, a motor-generator capable of assisting running of the vehicle and an electric energy storage device connected to the motor-generator, the control apparatus comprising a controller that:

predicts a future state of a charge/discharge of the electric energy storage device; and changes a target value of charge of the electric energy storage device based on a result of the prediction regarding the future state of the charge/discharge of the electric energy storage device.

2. The electric energy charging control apparatus according to claim 1, wherein the controller predicts the future state based on a state of the run of the vehicle, and changes the target value by:

increasing the target value of charge when the state of the run of the vehicle is a state in which at least a predetermined amount of the charge is predicted to be discharged from the electric energy storage device, and by reducing the target value of charge when the state of the run of the vehicle is a state in which at least a predetermined amount of the charge is predicted to be charged into the electric energy storage device.

3. The electric energy charging control apparatus according to claim 1, wherein the controller changes the target value of charge of the electric energy storage device in accordance with a vehicle ambient temperature.

4. The electric energy charging control apparatus according to claim 2, wherein the state of the run of the vehicle is a vehicle speed of the vehicle.

5. The electric energy charging control apparatus according to claim 4, wherein if the vehicle speed of the vehicle is a low vehicle speed for a predetermined time, the controller increases the target value of charge of the electric energy storage device to secure an amount of charge at least equal to an amount of charge that will be consumed by the motor-generator in anticipation of the vehicle being stopped or greatly accelerated.

6. The electric energy charging control apparatus according to claim 4, wherein
if the vehicle speed of the vehicle speed is a high vehicle speed for a predetermined time, the controller decreases the target value of charge of the electric energy storage device to increase a region for recovery of a regenerative energy that is to be obtained through the motor-generator in anticipation of a future state of the vehicle being decelerated.

7. The electric energy charging control apparatus according to claim 6, wherein:
a quantity of charge of the electric energy storage device corresponding to the decrease in the target value of charge is used by the motor-generator to assist in driving the vehicle, thereby reducing the output of the internal combustion engine and improving fuel economy.

8. The electric energy charging control apparatus according to claim 3, wherein
if the vehicle ambient temperature of the vehicle is lower than a predetermined temperature, the controller increases the target value of charge of the electric energy storage device to secure an amount of charge at least equal to an amount of charge that will be consumed by the motor-generator in anticipation of a low charging/discharging efficiency.

9. The electric energy charging control apparatus according to claim 3, wherein
if the vehicle ambient temperature of the vehicle is at least equal to a predetermined temperature, the controller only slightly increases the target value of charge of the electric energy storage device to secure an amount of charge at least equal to an amount of charge that will be consumed by the motor-generator in anticipation of a normal start or acceleration.

10. A electric energy charging control method for a hybrid vehicle including an internal combustion engine, a motor-generator capable of assisting a run of the vehicle, and a electric energy storage device connected to the motor-generator, the method comprising:
predicting a future state of charge/discharge of the electric energy storage device; and
changing a target value of charge of the electric energy storage device based on a result of the prediction regarding the future state of the charge/discharge of the electric energy storage device.

11. The electric energy charging control method according to claim 10, wherein the future state of charge/discharge of the electric energy storage device is predicted based on a state of the run of the vehicle, and wherein:
the target value of charge is increased if, from the state of the run of the vehicle, at least a predetermined amount of the charge is predicted to be discharged from the electric energy storage device at a future time, and
the target value of charge is reduced if, from the state of the run of the vehicle, at least a predetermined amount of the charge is predicted to be charged into the electric energy storage device at the future time.

12. The electric energy charging control method according to claim 10, wherein the target value of charge of the electric energy storage device is changed in accordance with a vehicle ambient temperature.

13. The electric energy control method according to claim 11, wherein the state of the run of the vehicle is a vehicle speed of the vehicle.

14. The electric energy charging control method according to claim 13, wherein:
if the vehicle speed of the vehicle is a low vehicle speed for a predetermined time, the target value of charge of the electric energy storage device is increased to secure an amount of charge at least equal to an amount of charge that will be consumed by the motor-generator in anticipation of the vehicle being stopped or greatly accelerated.

15. The electric energy charging control method according to claim 13, wherein:
if the vehicle speed of the vehicle speed is a high vehicle speed for a predetermined time, the target value of charge of the electric energy storage device is decreased to increase a region for recovery of a regenerative energy that is to be obtained through the motor-generator in anticipation of a future state of the vehicle being decelerated.

16. The electric energy charging control method according to claim 15, wherein:
a quantity of charge of the electric energy storage device corresponding to the decrease in the target value of charge is used by the motor-generator to assist in driving the vehicle thereby reducing the output of the internal combustion engine and improving fuel economy.

17. The electric energy charging control method according to claim 12, wherein
if the vehicle ambient temperature of the vehicle is lower than a predetermined temperature, the target value of charge of the electric energy storage device is increased to secure an amount of charge at least equal to an amount of charge that will be consumed by the motor-generator in anticipation of a low charging/discharging efficiency.

18. The electric energy charging control method according to claim 12, wherein:
if the vehicle ambient temperature of the vehicle is at least equal to a predetermined temperature, the target value of charge of the electric energy storage device is only slightly increased to secure an amount of charge at least equal to an amount of charge that will be consumed by the motor-generator in anticipation of a normal start or acceleration.

* * * * *